UNITED STATES PATENT OFFICE.

LAURENS KENT, OF DORSET, VERMONT.

IMPROVEMENT IN THE MODE OF EXTRACTING COLOR FROM DYE-WOODS.

Specification forming part of Letters Patent No. 951, dated September 27, 1838.

*To all whom it may concern:*

Be it known that I, LAURENS KENT, of Dorset, in the county of Bennington and State of Vermont, have invented a new and improved mode of extracting the color from dye-woods by steam or distillation, reducing the same to a gum or powder; and I do hereby declare that the following is a full and exact description.

The nature of my invention consists in extracting the color from dye-woods, reducing the same to a gum or powder in a pure state and in greater quantities than can be produced in the common way of boiling.

To enable others skilled in the art to make and use my invention, I will proceed to describe its construction and operation.

I construct my steamer or tub sufficiently large to contain four or five hundred pounds of ground wood, the tub standing on the end. Eight inches from the bottom I fix a fine strainer. The tub above the strainer is then filled and made perfectly tight. Through the center of the head I enter my steam-pipe from the boiler or still, which is brass or copper. The steam condenses in the wood, and leaches into the space below the strainer strong liquor. This is drawn off and put again into the boiler, and the water or liquor run off again into the wood, as before, leaving the coloring substance in the boiler, which is taken out and dried. As the color or gum of some dye-woods cannot be extracted perfectly with water, I make use of alcohol, and in that case I enter a worm below the strainer seven inches from the bottom of the tub, to condense the alcoholic steam that comes through the wood.

What I claim as my invention, and desire to secure by Letters Patent, is—

The manner herein described of extracting the color from dye-woods by steam and distillation, reducing the same to a gum or powder in a pure state, separate from the wood, to be used for dyeing and staining.

LAURENS KENT. [L. S.]

Witnesses:
HARVEY HOLLEY,
I. A. HODGE.